United States Patent Office 2,910,448
Patented Oct. 27, 1959

2,910,448

VINYL RESIN EMULSIONS CONTAINING METHOXY POLYETHYLENE GLYCOL

Albert I. Goldberg, Berkeley Heights, and Kazimierz V. Jasinski, North Plainfield, N.J., assignors to National Starch Products Inc., New York, N.Y., a corporation of New York No Drawing. Application March 29, 1956
Serial No. 574,613

2 Claims. (Cl. 260—29.6)

This invention relates to new and improved vinyl resin compositions. More specifically it relates to improved aqueous emulsions of vinyl esters of organic and inorganic acids, and emulsions of copolymers of such vinyl esters with other polymerizable monomers.

It is an object of this invention to provide emulsions of vinyl polymers and copolymers characterized by notably improved freeze-thaw resistance, as well as resistance to heat discoloration. It is a further object to provide vinyl emulsions characterized by improved gloss, clarity and water-resistance of the films deposited from such emulsions.

We have discovered that these and other improvements are obtained by adding to such emulsions in major proportion, a methoxy polyethylene glycol in a minor proportion.

Resins such as polyvinyl acetate, polyvinyl chloride, polyvinyl propionate, polyvinyl butyrate and other polymerized vinyl esters have gained wide acceptance in the fields of adhesives, coatings and other industrial applications. A particularly convenient way to use these resins is in the form of their aqueous emulsions. In this connection, it should be pointed out that if one defines "emulsions" in the strictest sense of the word as dispersions of liquid globules in a liquid medium, then these vinyl resin "emulsions" are not truly emulsions, but rather dispersions or suspensions of solid particles in a liquid. However, in the trade it is customary to refer to such suspensions of vinyl resins as emulsions, and it is therefore understood that when we use the latter term we do so in the broadest sense as including relatively stable dispersions or suspensions of solid particles of the resin in a liquid medium.

In order to obtain desired modifications of properties, it has also been known to prepare copolymers of vinyl resins with other polymerizable monomers. As examples of such comonomers one might mention those which tend to introduce acidic groups into the resulting copolymer, such for example as crotonic acid, or those which impart integral plasticization to the copolymer such as the esters of alpha beta ethylenically unsaturated dicarboxylic acids, including the esters of maleic and fumaric acids. Other generally used comonomers are the esters of acrylic and methacrylic acids (or the acids themselves).

The emulsions of these polymers and copolymers are prepared by means well known to those in the art. Thus, they may be made by bulk polymerization or solution polymerization, followed by emulsification in water, or emulsion polymerization techniques may be employed, i.e. emulsifying the monomers in water and conducting the polymerization in the emulsion state (ordinarily in the presence of a polymerization catalyst and emulsifying agent).

In many industrial applications the dried film of the resin is subjected to heat, and discoloration of vinyl polymer and copolymer resins under such heating has been a major problem.

Another property of major importance is the freeze-thaw stability of the resin emulsion as well as of the formulations made with the emulsion (e.g., paints). It is obvious that the resin emulsion (whether formulated with other ingredients or not), when stored or transported in containers (usually metal drums) may sometimes be exposed to freezing conditions. Some emulsions, once having frozen, are quite useless after thawing, because the thawed mass has either coagulated or otherwise deteriorated in texture, and cannot feasibly be brought back to the original emulsion state. "Freeze-thaw stability" refers to the property whereby after freezing and subsequent thawing the resin emulsion reverts to its original emulsion form, without substantial change in viscosity, texture and other properties.

For many industrial applications, particularly in coating work, the clarity of the dried film of the resin is also of major importance. A hazy, cloudy, or opaque film can be an obstacle to the usefulness of a resin, in spite of any other advantageous properties it might possess. Yet, dried films of vinyl polymer and copolymer emulsions often tend to be hazy or cloudy in appearance.

When depositing a film of a resin emulsion upon a surface, it is ordinarily desirable that the individual resin particles fuse, or coalesce, so as to form a relatively continuous film of the dried resin. In order to promote this coalescence of the individual resin particles in the film, it has been known to add various plasticizing chemicals to the emulsion. These plasticizers, apparently by softening the particles tend to promote their coalescense into a continuous film. A favorable result of the use of plasticizers is not only the formation of a film which is more continuous and flexible but often also one which is more water-resistant. However, the plasticizers used for vinyl polymer and copolymer emulsions were often attended by certain serious drawbacks. The most important was the deterioration in freeze-thaw resistance caused by the plasticizers. In other words, a vinyl polymer emulsion, which, when unplasticized, had good freeze-thaw resistance, was found to have very much poorer resistance when it contained a plasticizer. An example of this defect is seen when comparing an unplasticized aqueous emulsion of polyvinyl acetate of approximately 50% solids with a similar emulsion containing 3% dibutyl phthalate as plasticizer. When the first emulsion is subjected to freezing and subsequently thawed, it reverts to a satisfactory emulsion. However, the plasticized emulsion, when frozen and thawed, remains as a coagulated, useless mass. Since freeze-thaw resistance is of major industrial importance, it is seen that the deterioration in this property caused by added plasticizers was a serious defect.

Similarly, when various additives were used to overcome the defect of hazy films, as for example hexylene glycol, etherified glycols of 6–10 carbon atoms, unsubstituted polyalkylene glycol and weak organic acids, these either did not prove sufficiently effective, or they resulted in the deterioration of freeze-thaw stability described above.

We have now found that excellent improvements are obtained including formation of relatively continuous, flexible, water resistant films, together with notable film clarity and, above all, resistance to heat discoloration and notable freeze-thaw resistance, when aqueous emulsions of vinyl polymers and copolymers are mixed with minor proportions of methoxy polyethylene glycol having a molecular weight within the approximate range 335–785.

The formula for methoxy polyethylene glycol may be expressed generically as follows:

$CH_3OCH_2CH_2—(OCH_2CH_2—)_nOCH_2CH_2OH$ wherein n varies from 5 to 15, for the above-mentioned molecular weight range.

Unlike many of the hitherto used additives and plasticizers, which are not soluble in water, the methoxy polyethylene glycols used in our invention are completely water soluble, and compatible with the vinyl resins. While we are not certain of the reason for the remarkable efficiency of these additive materials, it may be that the water solubility results in a better fusion of resin-additive-water, which may account in part, at least, for the excellent film clarity and freeze-thaw resistance, as well as the other noted improvements.

It should be emphasized that while the methoxy polyethylene glycol has a plasticizing action upon the vinyl resin, it also functions to impart properties above and beyond mere plasticity (as for example, the previously mentioned freeze-thaw stability, resistance to heat discoloration, and the like). Thus, the methoxy polyethylene glycol may be used as the sole plasticizer in a vinyl resin emulsion, or it may be used as an additive in conjunction with a standard plasticizing agent.

The methoxy polyethylene glycols suitable for our invention, namely, those within the molecular weight range 335–785, are ordinarily water-white liquids, although at low temperatures the higher molecular weight materials sometimes tend to become waxy solids. They may be added in liquid form to the vinyl polymer emulsion, with ordinary mixing. In some cases it is found feasible, particularly in emulsion-polymerization procedures, to add the methoxy polyethylene glycol to the original emulsion of monomers, prior to polymerization.

With regard to proportions, we have found that quantities of the methoxy polyethylene glycol as low as 1% (based on the weight of the total solids in the emulsion) are effective, and on the other hand one may use quantities as high as 20%, or even higher. The particular quantity of additive will be chosen in the light of the properties desired in the final product, and with regard to the nature of the particular resin in the emulsion. Thus, it is known that emulsions of the smaller particle size, lower molecular weight resins tend to require less additive than the corresponding larger particle size, higher molecular weight resins.

The particular molecular weight type of methoxy polyethylene glycol to be used will also vary with the properties desired. Thus, if maximum non-volatility of the additive is indicated, we prefer to have the glycol within the molecular weight range 715–785, and if optimum freeze-thaw stability is desired a molecular weight range of 335–365 is preferred.

As stated, the additive of our invention is effective when used as a component of an emulsion of a vinyl ester polymer or of an emulsion of a copolymer of a vinyl ester with another polymerizable monomer. We have found the improvement in freeze-thaw stability, clarity of film and resistance to heat discoloration to be particularly marked when the additive is used with emulsions of internally plasticized vinyl acetate copolymers (that is, copolymers of vinyl acetate with monomers from the class maleic, fumaric and acrylic esters, which have an internally plasticizing effect upon the resultant copolymers).

The following examples will further illustrate the embodiment of our invention:

Example I

This example indicates the effect of methoxy polyethylene glycol, added to an aqueous emulsion of polyvinyl acetate, in producing clear films, as well as exerting a plasticizing (softening) effect.

To samples of an aqueous emulsion of polyvinyl acetate of approximately 55% solids, wherein the polyvinyl acetate had an intrinsic viscosity of 0.8 in acetone, and a particle size of approximately 0.5–1.0 micron, there were added varying proportions of methoxy polyethylene glycol of approximately 350 molecular weight. Films of the emulsion samples were then cast upon glass plates, to a thickness of approximately 0.8 mil (dry), and the dried films were then tested for clarity and for softness. The clarity was observed visually, and the softness was evaluated by the use of the Sward Hardness Rocker, manufactured by Henry A. Gardner Laboratory, Inc., Bethesda, Md. This consists of a rocker (acting as a pendulum) which is placed upon the dried resin film, cast on glass, and caused to rock freely. The harder the material being tested, the greater the number of oscillations the rocker will make. Thus, in the following table, a lowering of Sward Hardness Rocker values ("SHR") indicates a softening of the film.

| Percent Methoxy Polyethylene Glycol (Based on wt. of emulsion solids) | SHR Value | Film Appearance |
|---|---|---|
| 0 | 44 | Cloudy. |
| 3 | 28 | Hazy. |
| 5 | 20 | Do. |
| 7 | 14 | Slightly hazy. |
| 10 | 10 | Clear. |
| 15 | 2 | Do. |
| 20 | 1 | Do. |

Example II

The procedure of Example I was repeated, but using, in place of the polyvinyl acetate emulsion, an aqueous emulsion of a copolymer made from 90 mol percent vinyl acetate and 10 mol percent dibutyl fumarate. The intrinsic viscosity of the resin in acetone was approximately 0.6, and the average particle size approximately 0.5 micron. Film clarity and softness were noted as in Example I.

| Methoxy Polyethylene Glycol | | SHR Value | Film Appearance |
|---|---|---|---|
| Percent | Molecular weight | | |
| 0 | | 24 | Hazy. |
| 3 | 350 | 10 | Clear. |
| 3 | 550 | 10 | Do. |
| 3 | 750 | 10 | Do. |

Example III

In this example, we tested two different vinyl copolymer emulsions, comparing the effect, as additives, of methoxy polyethylene glycol and hexylene glycol. The emulsions containing these additives were tested for freeze-thaw stability, and their films were tested for clarity, hardness, and for resistance to discoloration upon heating.

Freeze-thaw stability was tested by placing 100 grams of the emulsion in a steel beaker, which was then sealed with a rubber stopper. The beaker was allowed to stand for one hour at 72° F., and the consistency of the emulsion noted. The beaker was then placed in an agitated glycol bath, maintained at −18° C. for 24 hours. At the conclusion of the 24-hour period the sample was observed for solidity, and then allowed to thaw at room temperature for 24 hours. The thawed sample was then checked again for consistency, flow properties, and other required characteristics.

Heat discoloration was checked by casting a film of the emulsion on a white porcelain glass panel and heating for 45 minutes in an oven at 150° C. Color readings were then taken on the "Photovolt Reflectometer" (Model 610) made by the Photovolt Corporation, the reading 0 referring to a colorless film and 70 to black.

In the following table, "Copolymer Emulsion A" is an aqueous emulsion containing 55% of a resin comprising the copolymerization product of 90 mol percent vinyl acetate and 10 mol percent dibutyl fumarate. The intrinsic viscosity of the resin, in acetone, was approximately 0.9, and the average particle size approximately 0.5 micron. "Copolymer Emulsion B" is an aqueous emulsion containing 55% of a resin comprising the copolymerization product of 88 mol percent vinyl acetate and 12 mol percent dibutyl maleate. The intrinsic viscosity of the resin in acetone was approximately 0.4 and the average particle size less than 0.5 micron. It will be noted that in both the dibutyl fumarate and dibutyl maleate the ester group is derived from an aliphatic straight-chain alcohol.

| Product | SHR | Quality after Freeze-Thaw Test | Heat Discoloration (Reflectometer Value) |
|---|---|---|---|
| Copolymer emulsion "A" | 24 | Satisfactory | 14 |
| "A" plus 3% methoxy polyethylene glycol (350 mol. weight) | 10 | do | 3 |
| "A" plus 1% methoxy polyethylene glycol (350 mol. weight) | 18 | do | 9 |
| "A" plus 3% hexylene glycol | 24 | Coagulated | 14 |
| Copolymer emulsion "B" | 18 | do | 20 |
| "B" plus 3% methoxy polyethylene glycol (350 mol. weight) | 10 | Satisfactory | 7 |
| "B" plus 3% hexylene glycol | 18 | Coagulated | 21 |

In variations of the above example, using methoxy polyethylene glycol in the proportions 5% and 10%, respectively, it was found that flexibility and freeze-thaw stability were enhanced, and the heat discoloration further decreased as the quantity of methoxy additive was increased, with no deleterious effects upon the other properties. Nevertheless, it is not ordinarily advisable to employ an amount of the methoxy polyethylene glycol greater than that necessary to achieve the particular properties desired, since, like any additive, the greater the percentage used, the lower will be the percentage of resin in the formulation.

*Example IV*

In this example, we illustrate the freeze-thaw stability effect of methoxy polyethylene glycol when used with polyvinyl acetate emulsion as a component of a paint formulation.

Two samples of the polyvinyl acetate emulsion of Example I were taken; one was mixed with 10% (by weight of the emulsion solids) of dibutyl phthalate. The other was mixed with 10% (by weight of the emulsion solids) of methoxy polyethylene glycol, 350 mol. wt.

Each of these two emulsions was then compounded into a paint by mixing with a previously prepared formulation of pigment, dispersant and protective colloid, in a manner well known to the paint art. In this particular case, the pigment volume concentration was 37. The actual paint was prepared as follows. There were charged into a mixer, with agitation, 80 parts water, 1 part potassium tripolyphosphate (dispersing agent), 4 parts Advawet #33 (a polyglycol ester dispersing agent sold by Advance Solvents & Chemical Corporation, New York), 25 parts mica, 100 parts talc, 225 parts titanium dioxide (the last three items being pigments) and 150 parts of a 2% solution of methyl cellulose. The latter, which serves as a protective colloid, is sold by the Dow Chemical Company, Midland, Michigan, under the trade name "Methocel 4000 cps." The above mixture was dispersed in a high speed mill and there was slowly added 50 additional parts of the 2% methyl cellulose solution, 104 parts water, 30 parts ethylene glycol and 330 parts of the polyvinyl acetate emulsion. In one case, the emulsion was that which contained the dibutyl phthalate; in the other case, it was that which contained the methoxy polyethylene glycol.

Upon subjecting these paint samples to the freeze-thaw test described in Example III, it was found that the sample containing the methoxy polyethylene glycol completely recovered after thawing, its viscosity and texture remaining essentially constant. On the other hand, the sample containing the dibutyl phthalate additive became gritty with a large, unacceptable increase in package viscosity.

While in the above examples we have emphasized the use of methoxy polyethylene glycol as an additive to emulsions of polyvinyl acetate and copolymers of vinyl acetate with other polymerizable monomers, it has also been found effective in conjunction with other vinyl resins. Thus, for example, when added to a polyvinyl chloride emulsion of approximately 50% solids, in the proportion of 10% based on the resin solids, the dried films of the resin exhibited excellent continuity and clarity, as contrasted to films of the emulsion which did not contain the additive.

Whereas previously known additives may have succeeded in imparting one or more of the herein described advantageous characteristics, such as enhanced clarity, freeze-thaw stability, resistance to heat discoloration, and non-volatile plasticization, the achievement of one property was usually accompanied by deleterious effects upon the others. The surprising, and highly valuable, aspect of our use of methoxy polyethylene glycol as an additive to aqueous emulsions of vinyl polymers, and copolymers of vinyl monomers with other polymerizable comonomers, is that one achieves all of these advantages in combination.

Variations in resin types, proportions and procedures will be apparent to those skilled in the art, and the specific examples hereinabove given are meant merely as illustrations, and not as limitations upon the scope of our invention.

We claim:

1. A vinyl resin composition comprising a mixture of an aqueous emulsion of a vinyl resin and methoxy polyethylene glycol of molecular weight within the range 335–785, the methoxy polyethylene glycol being present in an amount of from 1% to 20% based on the total resin solids in the emulsion, in which said vinyl resin is selected from the class consisting of polyvinyl acetate, polyvinyl chloride, polyvinyl propionate, polyvinyl butyrate and copolymers of a monomer selected from the class consisting of vinyl acetate, vinyl chloride, vinyl propionate and vinyl butyrate with a comonomer selected from the class consisting of crotonic acid, acrylic acid, methacrylic acid, and the esters of acrylic, methacrylic and alpha, beta ethylenically unsaturated dicarboxylic acids resulting from the reaction of said acids with an aliphatic straight-chain alcohol.

2. A paint composition comprising a mixture of an aqueous emulsion of a vinyl resin and methoxy polyethylene glycol of molecular weight within the range 335–785, the methoxy polyethylene glycol being present in an amount of from 1% to 20% based on the total resin solids in the emulsion, in which said vinyl resin, formulated with paint pigment, paint dispersant and paint colloid, is selected from the class consisting of polyvinyl acetate, polyvinyl chloride, polyvinyl propionate, polyvinyl butyrate and copolymers of a monomer selected from the class consisting of vinyl acetate, vinyl chloride, vinyl propionate and vinyl butyrate with a comonomer selected from the class consisting of crotonic acid, acrylic acid, methacrylic acid, and the esters of acrylic, methacrylic and alpha, beta ethylenically unsaturated dicarboxylic acids resulting from the reaction of said acids with an aliphatic straight-chain alcohol.

References Cited in the file of this patent

UNITED STATES PATENTS

| | | |
|---|---|---|
| 2,351,301 | Sonnichsen | June 13, 1944 |
| 2,435,950 | Neher et al. | Feb. 10, 1948 |

(Other references on following page)

UNITED STATES PATENTS

| | | |
|---|---|---|
| 2,484,962 | Rust | Oct. 18, 1949 |
| 2,595,953 | Kunze | May 6, 1952 |
| 2,602,048 | Michaels et al. | July 1, 1952 |

FOREIGN PATENTS

| | | |
|---|---|---|
| 635,986 | Great Britain | Apr. 19, 1950 |

OTHER REFERENCES

Carbide and Carbon Chemicals Company, "Physical Properties Synthetic Organic Chemicals," 1953 edition, 30 East 42nd St., New York 17, N.Y., page 16.

Hackh's Chemical Dictionary, 3rd edition, Blakiston Company, Philadelphia, Pa., page 333.